United States Patent [19]

McKee

[11] 4,417,342
[45] Nov. 22, 1983

[54] LASER

[75] Inventor: Terrence J. McKee, Nepean, Canada

[73] Assignee: Lumonics Inc., Kanata, Canada

[21] Appl. No.: 239,992

[22] Filed: Mar. 3, 1981

[51] Int. Cl.³ .............................................. H01S 3/097
[52] U.S. Cl. ..................................... 372/87; 372/97; 372/86
[58] Field of Search ..................... 372/86, 87, 83, 82, 372/97

[56] References Cited

U.S. PATENT DOCUMENTS 4,207,540  6/1980  Ernst ................................ 372/86

OTHER PUBLICATIONS

"Injection Locking of a Xenon Fluoride Laser", Goldhar et al., *App. Phys. Lett.*, vol. 31, No. 10, Nov. 15, 1977.
"High-Energy Subnanosecond Pulse Amplification in XeCl", Pacala et al., *App. Phys. Lett.*, vol. 37, No. 4, Aug. 15, 1980.
"Operating and Beam Characteristics, Including Spectral Narrowing, of a TEA Rare-Gas Halide Excimer Laser", McKee; *IEEE Jour. Quant. Elecs.*, vol. 15, No. 5; 1979.
"Necessary Conditions for the Homogeneous Formation of Pulsed Avalanche Discharges at High Gas Pressures", Levatter et al.; *Jour. App. Phys.*, vol. 51, No. 1, 1980.
"A Scalable Multiatmosphere High-Power XeF Laser", Sargeant et al.; *App. Phys. Lett.*, vol. 30, No. 12, Jun. 15, 1977.
"Spatially Resolved Gain Measurements in UV Preionized Homogeneous Discharge XeCl and KRF Lasers", Watanabe et al.; *App. Phys. Lett.*, vol. 38, No. 1, Jan. 1, 1981.
"Resistive Stabilisation of a Discharge-Excited XeCl Laser", Hogan et al.; *Jour. of Phys. D: App. Phys.*, vol. 13, 1980.

*Primary Examiner*—James W. Davie
*Assistant Examiner*—Léon Scott, Jr.

[57] ABSTRACT

A gas laser includes a pair of subsidiary electrodes to form a sharpening gap. These subsidiary electrodes are located within the envelope of the laser so as to be exposed to the same gas or mixture of gases that flow between the main electrodes and support the main lasing action. The efficiency of the laser and the lifetime of the electrodes of the sharpening gap are thereby improved, together with other advantages.

8 Claims, 6 Drawing Figures

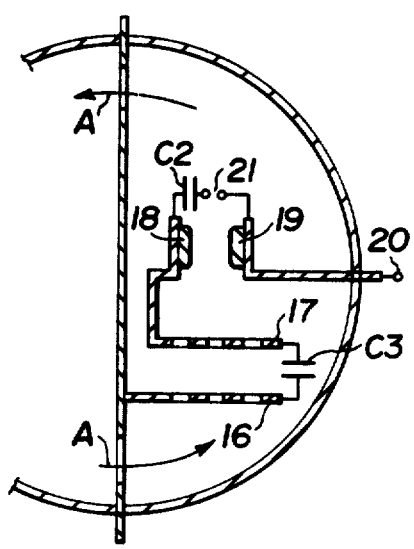
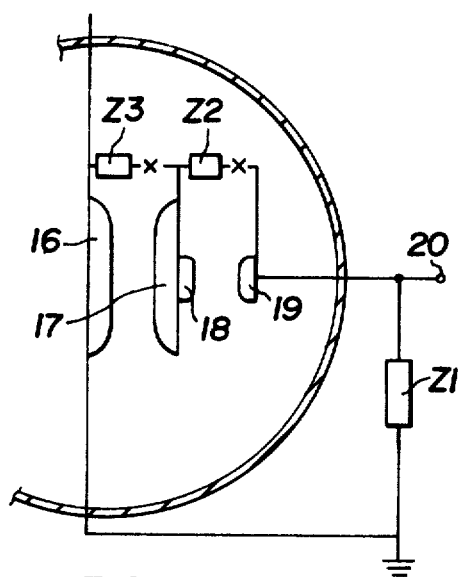
FIG. 3   FIG. 4
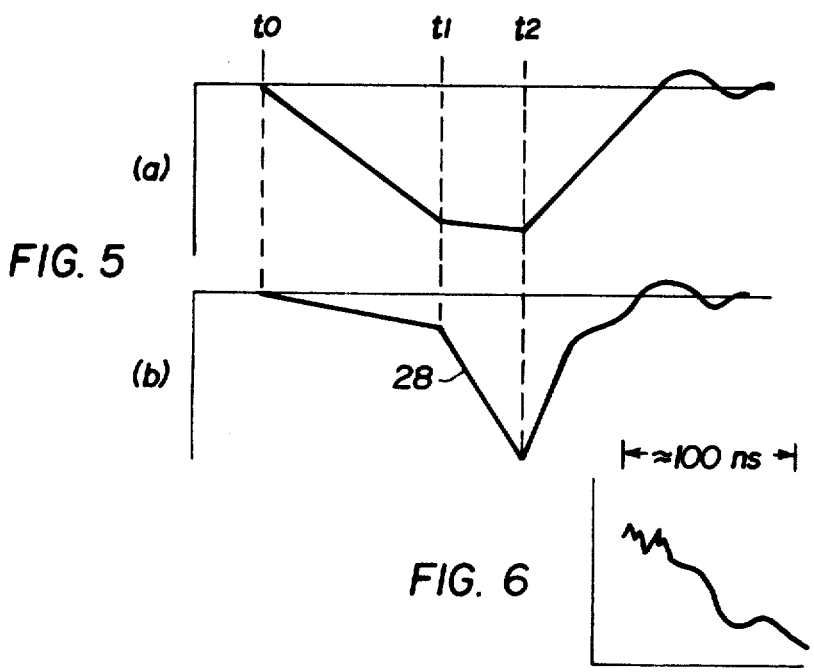
FIG. 5
FIG. 6

LASER

FIELD OF THE INVENTION

This invention relates to improvements in electrical discharge gas lasers, and has special applicability to rare gas halide and metal halide excimer lasers, for example a xenon chloride excimer laser.

In the embodiments of the invention that are discussed below a xenon chloride excimer laser will be taken as the principal example. However, the concepts of the invention are applicable to other pulsed, gas discharge lasers, such as other excimer lasers and $N_2O$, HF, DF, CO, and $CO_2$ lasers.

BACKGROUND OF THE INVENTION

A primary aim in the art is to increase the proportion of input energy that appears in the laser output. This problem is essentially one of achieving improved impedance matching, and prior workers have adopted the use of low impedance switches, called "rail gaps" or "sharpening gaps," to aid in achieving a better impedance match between the energy storage network and the electrical discharge. The result has been increased laser efficiency and an increased laser pulse length. Such a sharpening gap has been located external to the laser envelope and has exhibited a low impedance by virtue of employing a series of arcs distributed in parallel along the length of the device. Such a sharpening gap can be triggered by a further electrode or some other suitable external means.

However, such sharpening gaps have proved to be cumbersome devices with relatively short reliable lifetimes before electrode pitting becomes severe.

SUMMARY OF THE INVENTION

The present invention aims to achieve the advantage of a sharpening gap, i.e. improved impedance matching, while at the same time avoiding the essential disadvantage of a limited usable lifetime.

This result is achieved according to the invention by forming a sharpening gap by means of a subsidiary pair of spaced-apart electrodes that are mounted inside the laser envelope so as to be exposed to the same gas or mixtures of gases that support lasing action in the lasing region between the main electrodes.

The two sets of electrodes are connected as a series circuit, and an impedance element is connected across each pair of electrodes. These elements serve a voltage dividing function and can be capacitors, resistors, inductors or combinations thereof. Preferably, a further capacitor or pulse forming network is connected across the series circuit for feeding extra energy into the main electrodes during lasing action.

Suitable means, such as spark gaps in series with each of the impedance elements connected across the respective pairs of electrodes, are provided to subject the sharpening gap and the main lasing region to ultraviolet preionization radiation. Alternatively, the sharpening gap itself can act as the preionizing means for the main lasing region. As a further alternative, preionization may be achieved from an external source independent of the impedance elements.

To fire the laser, a voltage pulse is applied across the series circuit. The relative values of the impedance elements are preferably so chosen that the major portion of the voltage of such pulse appears initially across the subsidiary electrodes until the sharpening gap breaks down and thus acts as a low impedance switch. When the sharpening gap does break down the voltage across the main electrodes increases rapidly until the region between them in turn breaks down to initiate the main lasing action. The region between the subsidiary electrodes will have also generated a lasing action when it broke down, assuming that both sets of electrodes are provided with the usual optical systems.

The various advantages of such a system are described below in relation to the specific embodiments of the invention.

BRIEF DESCRIPTION OF THE DRAWINGS

Embodiments of the invention are illustrated by way of example in the accompanying drawings, in which:

FIG. 3 is a fragment of FIG. 1 showing a modification;

FIG. 4 is an equivalent circuit of FIG. 1;

FIGS. 5(a) and (b) are voltage traces; and

FIG. 6 is a pulse diagram.

DETAILED DESCRIPTION OF THE PREFERRED EMBODIMENT

Figure 1:
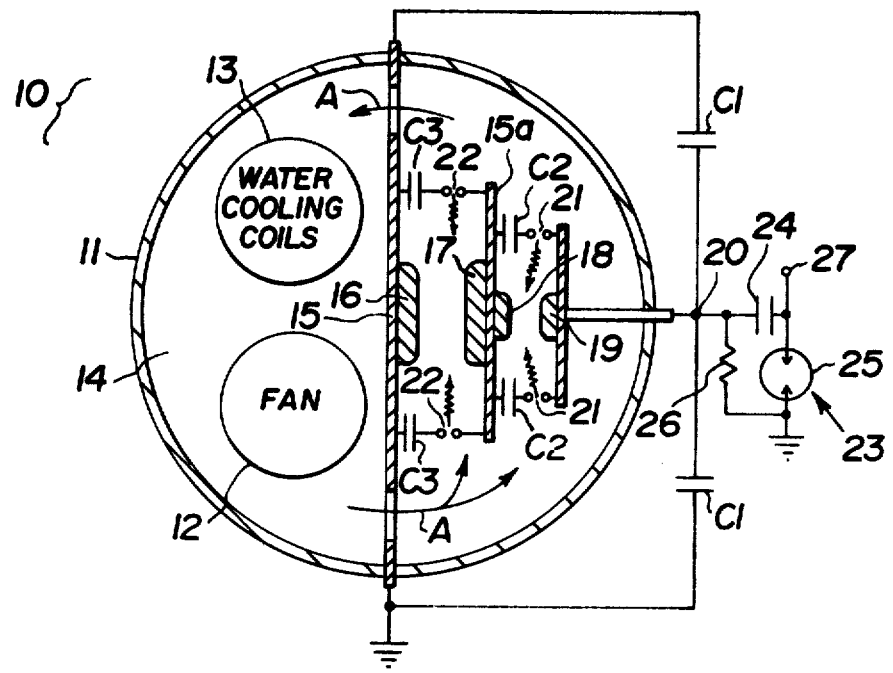
FIG. 1 is a schematic diagram, taken as a cross-section transverse to the main optical axis, of a laser embodying the invention.
Figure 2:
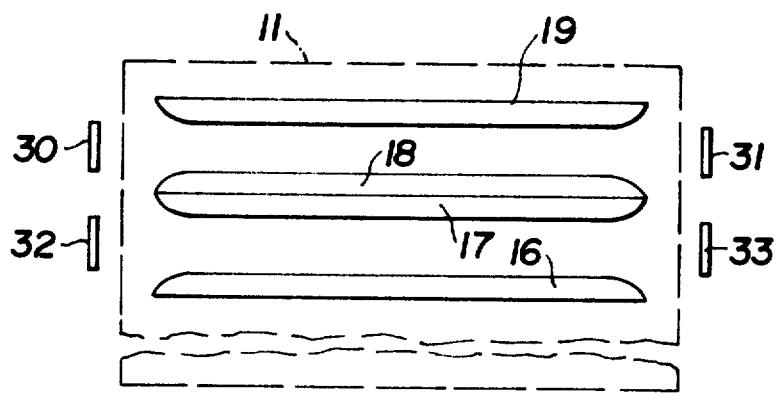
FIG. 2 is a diagrammatic view taken transverse to FIG. 1.

A multigas excimer laser 10 has a chamber defined by an envelope 11 that contains an appropriate gas or gas mixture, e.g. xenon and hydrogen chloride, to provide lasing action. This gas mixture is made to flow, as shown by the arrows A, among electrodes 16 to 19 by a conventional recirculating system including a fan 12 and water cooling coils 13 situated in an area 14 separated by a perforated partition 15 from the electrodes 16 to 19. One main laser electrode 16 is mounted on the partition 15 which is grounded. The other main laser electrode 17 is mounted on a subsidiary partition 15a that also supports a subsidiary electrode 18 that forms a discharge gap with a second subsidiary electrode 19 connected to an external terminal 20. The electrodes 16, 17, 18 and 19 are, of course, unclad, in the sense that they face each other in pars with no insulation of their opposing faces, so that essentially the only impedance between each pair of such opposing faces is provided by the gas. The discharge gap formed between the subsidiary electrodes 18 and 19 acts as a voltage sharpening gap when it breaks down, as explained below.

Capacitors C1 external to the envelope 11 are connected between the grounded partition 15 and the terminal 20, i.e. across the series circuit of the main and subsidiary electrodes. Capacitors C2 which are preferably but not necessarily mounted within the envelope 11 are connected between the common mounting of electrodes 17 and 18 and the electrodes 19, i.e. across the subsidiary electrodes 18,19 with series spark gaps 21. Capacitors C3 also preferably but not necessarily within the envelope 11 are connected between the partition 15 and the partition 15a connected to the electrodes 17 and 18, i.e. across the main electrodes 16,17, with series spark gaps 22.

The gaps 21 and 22 serve for ultraviolet perionization of the respective discharge regions between the main electrodes 16,17 and the sharpening gap electrodes 18,19.

Alternatively, preionization can be performed by sparks along a surface, a corona or some other source of radiation, such as a laser or X-ray device. As a further option, if the sharpening gap electrodes 18,19 are turned transversely to the main electrodes 16,17, as shown in the alternative embodiment of FIG. 3, the region between the main electrode 16,17 can be preionized by radiation emitted by the lasing discharge between the electrodes 18,19. In this case the electrodes 16,17 are formed as perforate screens to permit both the radiation from the electrodes 18,19 and the gas to pass therethrough.

If desired, the values of the impedances Z1, Z2 and Z3, as shown in the equivalent circuit of FIG. 4, can be adjusted to optimise performance for the gas mixture in use. Resistors and/or impedance can be used in addition to or in place of the capacitors C2 and C3 to serve as a voltage dividing circuit.

In use, a voltage pulse is applied to the terminal 20 from a suitable conventional firing circuit such as the circuit 23 consisting of a capacitor 24, spark gap 25, resistor 26 and D.C. supply 27. This voltage pulse contains the energy for the laser discharges. The operation of the series discharge that results is best appreciated from FIG. 5. Part (a) of FIG. 5 shows the voltage between electrode 19 and ground, i.e. across the two laser gaps in series, while part (b) of FIG. 5 shows the voltage between electrode 17 and ground, i.e. across the main laser gap. These relative voltages are determined by the values of impedances Z1, Z2 and Z3. At an appropriate time before discharge takes place between either pair of laser electrodes, preionization takes place as described above. The impedance ratio is so chosen that initially, i.e. between times t0 and t1, the majority of the voltage drop takes place across the sharpening gap electrodes 18,19. At time t1 the sharpening gap fires, thus acting as a low inductance switch and causing the voltage between electrodes 16 and 17, i.e. across the main laser gap, to rise rapidly (curve portion 28). At time t2 the main discharge between electrodes 16 and 17 takes place. This manner of operation allows the large capacitors C1 outside the envelope to be charged up initially without their voltage appearing across the main laser gap. When the main gap fires, the capacitors C1 can feed into the main discharge and hence increase its output energy. The very fast voltage rise represented by the curve portion 28 is illustrative of highly desirable conditions for excimer laser operation.

Lasing action between electrodes 18,19 takes place from time t1, while lasing action between electrodes 16,17 takes place from time t2, such actions occurring in the respective optical cavities formed between the reflectors 30,31 and 32,33 in the usual way.

The optical output from the two discharges may be used separately, or one laser with appropriate external optical delay may be amplified by the second laser, or one laser may be used to control the second laser. As an example, a typical laser pulse at 308 nm from the discharge between electrodes 16,17 is shown in FIG. 6 for a gas mixture of 20 torr xenon, 1 torr hydrogen chloride and 1500 torr neon with a pulse energy of 140 milliJoules. The laser was operated at 5 pulses per second. A significant advantage demostrated by FIG. 6 is the lengthening of the pulse from a typical 8 nanoseconds FWHM (full width half maximum) to approximately a 100 nanosecond pulse FWHM. In this case, output from the discharge between electrodes 18, 19 was 50 milliJoules.

A laser according to the present construction has been operated for 5 million pulses at a repetition rate of up to 50 pulses per second with the above gas mixture with no adverse effects observed on the low inductance switch electrodes 18,19. The self-breakdown timing jitter of the low inductance switch is lowered by the presence of ultraviolet preionization and a timing jitter of ±5 nanoseconds has been observed. Without including the optical laser output from the electrodes 18,19 the laser output pulse energy from the main discharge between the electrodes 16,17 has been observed to double over that previously obtained from a similar single discharge laser operating with the same gas mixture. Total output pulse energy is larger still, when the output from the electrodes 18,19 is included. It should be noted that this technique can be extended to a multidischarge configuration with more than two laser discharges.

The impedance characteristics of the discharge between electrodes 18,19 and electrodes 16,17 may be similar, since these discharges take place in the same gas mixture. In this case, the impedance of the discharge between electrodes 18,19 may effectively ballast or restrict the current in the discharge between electrodes 16,17. This has been observed in the gas mixture described above to yield a pure glow discharge of cross-sectional area 20 by 20 millimeters between electrodes 16,17. The relative impedances of the discharges between electrodes 18,19 and electrode 16,17 may be adjusted by varying the gas mixture, the impedances Z1, Z2 and/or Z3, the electrode shape, geometry and spacing, and/or the means of preionization.

To summarise, the concept behind the present construction, is to combine two lasers inside a single envelope, and use one of them as a sharpening gap. The lifetime of the sharpening gap is thereby increased by many orders of magnitude, since the sharpening gap discharge is now similar to that seen in a laser, rather than multiple arcs. Other advantages inherent in this arrangement include:

(1) long pulse operation of the laser
(2) increased output energy
(3) lasing from both the main discharge and the sharpening gap
(4) pure glow discharge in the main laser.

Longer pulses are important, because their mode quality can be better controlled and they have different characteristics in marking or atmospheric propagation or in communications using lasers.

Since the sharpening gap is a second laser acting in the same gas as the main laser, it will have a similar impedance. This can be varied by adjusting the electrode profile and gap overvolting, but only to a certain degree. The sharpening gap will thus act as a variable impedance to actively limit the power dissipated in the main laser discharge after it has fired. It is this feature which is believed to lead to a glow discharge in the main laser operation. This effect is obtained in a preionized or stabilized volume discharge obtained in a laser-type sharpening gap.

The optical laser output from the sharpening gap discharge can be mode-controlled to provide a low divergence and/or linewidth-narrowed, turnable radiation. This radiation can be amplified in, or used to injection lock, the main laser discharge. In the past, this technique has been widespread, but two lasers have been required, one as a mode-controlled oscillator and one as an amplifier.

A preionized sharpening gap forming a laser discharge can be expected to have more uniform breakdown characterisitics leading to lower optical jitter than a self-breakdown switch, and this effect has been observed in the prototype.

The double discharge configuration leads to an increase in energy output from the laser. This is because energy stored in external capacitors or in an external pulse forming network can feed into the discharge. In addition, the laser output from the sharpening gap is an added bonus that leads to even larger total output energy. This is especially true of an excimer laser where much of the energy is not dissipated in the glow discharge but is dissipated in late arcs. In the case of the double discharge laser, it can still be used in the main discharge. This indicates the desirability of a multidischarge (triple or quadrupal) laser enhancing the efficiency.

The fact that both the sharpening gap and the main discharge are inside the same envelope means that gas flow can be provided for both by one fan. Most excimer lasers with sharpening gaps described in the literature have had no gas flow and operate below 1 pulse per second. By contrast, the prototype of the present construction described above has been operated up to 50 pulses per second.

In some circumstances the attainment of the ideal ballasting conditions may make it preferable to so arrange the impedances Z2 and Z3 in relation to the electrode geometry and spacing, that only a minority of the applied voltage will appear across the sharpening gap between times t0 and t1. In this case at least the advantages (1), (3) and (4) enumerated above can be expected to be obtained.

I claim:
1. A gas laser comprising
(a) an envelope,
(b) a gaseous medium in said envelope capable of lasing action,
(c) optical reflectors defining a main optical resonant cavity which extends along said envelope,
(d) a main pair of spaced-apart electrodes located in said envelope on respective sides of said main cavity to define a main lasing region in said cavity between said electrodes,
(e) a subsidiary pair of spaced-apart electrodes located in said envelope to define a discharge gap to act as a voltage sharpening gap,
(f) means connecting said main pair of electrodes in series with said subsidiary pair of electrodes to define a series circuit,
(g) means for subjecting said main lasing region and said sharpening gap to preionization radiation,
(h) a firing circuit connected across said series circuit for providing a rising voltage pulse to said series circuit,
(i) an impedance element connected across each of the pairs of electrodes, whereby, upon an application of said rising voltage pulse across said series circuit, a portion of the voltage of said pulse appears across the subsidiary electrodes until the sharpening gap breaks down to act as a low inductance switch and rapidly increase the voltage across the main electrodes until the region between them breaks down to initiate lasing action, and
(j) further optical reflectors defining a second optical resonant cavity which extends along said envelope,
(k) said subsidiary pair of electrodes being located on respective sides of said second cavity to define a second lasing region in said second cavity between said subsidiary electrodes for lasing action when the sharpening gap therebetween breaks down.

2. A laser according to claim 1, including a further capacitive impedance element connected across said series circuit for storing energy for release during lasing action between said main pair of electrodes for enhancing energy flow between said main pair of electrodes.

3. A gas laser comprising
(a) an envelope,
(b) a gaseous medium in said envelope capable of lasing action,
(c) optical reflectors defining a main optical resonant cavity which extends along said envelope,
(d) a main pair of spaced-apart electrodes located in said envelope on respective sides of said main cavity to define a main lasing region in said cavity between said electrodes,
(e) further optical reflectors defining a subsidiary optical resonant cavity which extends along said envelope,
(f) a subsidiary pair of spaced-apart electrodes located in said envelope to define a discharge gap to act as a voltage sharpening gap, said subsidiary pair of electrodes being located on respective sides of said subsidiary cavity to define a second lasing region in said subsidiary cavity between said subsidiary electrodes for lasing action when the sharpening gap therebetween breaks down,
(g) means connecting said main pair of electrodes in series with said subsidiary pair of electrodes to define a series circuit,
(h) means for subjecting said main and subsidiary lasing regions to preionization radiation,
(i) means for cooling and circulation through said lasing regions the gaseous medium in the envelope,
(j) at least one impedance element connected across each said pair of electrodes,
(k) at least one capacitor connected across said series circuit,
(l) a firing circuit connected across said series circuit for providing a rising voltage pulse to said series circuit,
(m) whereby, upon an application of said rising voltage pulse across said series circuit, a portion of the voltage of said pulse appears across the subsidiary electrodes until the sharpening gap between them breaks down to initiate lasing action in the subsidiary cavity and to act as a low inductance switch and rapidly increase the voltage across the main electrodes until the region between the main electrode breaks down to initiate lasing action in said main cavity and discharge the energy of said capacitor to enhance the energy flow between said main electrodes.

4. A laser according to claim 1, 2 or 3, wherein the means for subjecting the sharpening gap to preionization radiation is a spark gap in series with the impedance element across the subsidiary electrodes.

5. A laser according to claim 1, 2 or 3, wherein the means for subjecting the main lasing region to preionization radiation is a spark gap in series with the impedance element across the main electrodes.

6. A laser according to claim 1, 2 or 3, wherein the means for subjecting the main lasing region to preionization radiation comprises said sharpening gap.

7. A laser according to claim 1, 2 or 3, wherein the values of said impedance elements are such that said portion of the voltage appearing across the subsidiary electrodes until the sharpening gap breaks down is more than half.

8. A gas laser comprising (a) an envelope, (b) a gaseous medium in said envelope capable of lasing action, (c) optical reflectors defining a main optical resonant cavity which extends along said envelope, (d) a main pair of spaced-apart electrodes located in said envelope on respective sides of said main cavity to define a main lasing region in said cavity between said electrodes, (e) a subsidiary pair of spaced-apart electrodes located in said envelope to define a discharge gap to act as a voltage sharpening gap, (f) means connecting said main pair of electrodes in series with said subsidiary pair of electrodes to define a series circuit, (g) voltage divider means connected to said pairs of electrodes to divide between said pairs of electrodes a voltage applied across said series circuit, and (h) further optical reflectors defining a second optical resonant cavity which extends along said envelope, (i) said subsidiary pair of electrodes being located in said envelope on respective sides of said second cavity to define a second lasing region in said second cavity between said subsidiary electrodes for lasing action when the sharpening gap therebetween breaks down.

* * * * *